US005414617A

United States Patent [19]

Pomerleau et al.

[11] Patent Number: 5,414,617

[45] Date of Patent: May 9, 1995

[54] CONTROLLED ZONE VACUUM SYSTEM

[75] Inventors: Robert Pomerleau, Springfield, Mass.; Joseph R. Vivirito, South Windsor, Conn.

[73] Assignee: Gerber Garment Technology, Inc., Tolland, Conn.

[21] Appl. No.: 125,112

[22] Filed: Sep. 21, 1993

[51] Int. Cl.[6] .......................... G05B 11/01; B26D 7/04

[52] U.S. Cl. ................................ 364/140; 364/474.09; 269/21; 83/451

[58] Field of Search ................................ 364/140–142, 364/470, 474.09, 474.3; 269/21; 83/451, 939–941, 56, 374, 380, 422, 100, 76.1, 76.6–76.9

[56] References Cited

U.S. PATENT DOCUMENTS

| | | | |
|---|---|---|---|
| 4,528,878 | 7/1985 | Gerber | 83/451 |
| 4,587,873 | 5/1986 | Gerber | 83/451 |
| 4,723,766 | 2/1988 | Beeding | 269/21 |
| 4,730,526 | 3/1988 | Pearl et al. | 83/451 |
| 4,768,763 | 9/1988 | Gerber | 269/21 |
| 5,285,373 | 2/1994 | Watanabe et al. | 364/140 |

*Primary Examiner*—Paul P. Gordon
*Assistant Examiner*—Steven R. Garland
*Attorney, Agent, or Firm*—McCormick, Paulding & Huber

[57] ABSTRACT

A scheme for controlling the vacuum holddown in a cutter table of the type having a conveyorized support surface comprised of a plurality of bristle members which create a permeable bed through which a vacuum is communicated employs separate zone regions on the vacuum bed which are controllably energized and de-energized in response to command signals generated by a controller in response to cutter head movement which anticipates the position of the knife prior to its arrival at a given zone in order that material set up in reaction time in the valve system is allotting for.

14 Claims, 5 Drawing Sheets

CONTROLLED ZONE VACUUM SYSTEM

CROSS REFERENCE TO RELATED APPLICATIONS

This application relates to co-pending U.S. application Ser. No. 08/040,160 entitled CONTOUR BUILDER filed in the name of Zeeman et al on Mar. 30, 1993, which application being commonly assigned with the assignee of the present invention.

BACKGROUND OF THE INVENTION

This invention relates to a cutting apparatus whereby a sheet or layup of sheet material supported on an air impermeable vacuum bed is caused to be drawn against the support surface of the bed by applied vacuum, and further relates to a system whereby vacuum is introduced to selected zones in the bed in anticipation of the cutter head being moved to a zone not presently occupied by the cutter head during a cutting operation to thereby maximize draw efficiency in the vacuum pump supplied for the system.

In cutter beds, wherein a sheet or layup of sheets of material are supported on a vacuum bed in order to draw the sheet or stack of sheets against the bed in the localized region of cutter, attempts have been made to limit the vacuum applied to the entire bed strictly to the immediate region or zone in which the cutter is occupying. One such attempt is disclosed in U.S. Pat. No. 4,485,712, issued to H. Joseph Gerber on Dec. 4, 1984 entitled METHOD AND APPARATUS FOR HOLDING SHEET MATERIAL IN A SECTION VACUUM BED. In the apparatus disclosed therein, a series of laterally extending plungers are provided in the bed which are capable of moving into and out of engagement with a vacuum manifold to control the introduction of vacuum into a given zone in response to being engaged by a cam located on the cutter head carriage as it moves past the involved plunger. Thus, each plunger being normally in its outwardly extending condition is moved to a closed to flow condition by the movement of the carriage to open its associated zone to vacuum supplied to it by the vacuum source. However, vacuum is only introduced to a zone with the arrival of the carriage at the zone and not before. This does not allow for settling to occur in the fabric once vacuum is applied, nor does it take into account valve actuation time either. Also, cutting of a layup sheet often involves cutting a line across a vacuum zone boundary, that is, the cutting which takes place extends between two zones which are controlled by separate valves. In this case, the cutter head carriage moves between points in respective adjacent zones in rapid succession thereby activating the zones in an alternating or a thrashing type manner. Thrashing is defined as activating and deactivating the same zone repeatedly within a short period of time which causes loads to be places on the system which would otherwise be desirably avoided.

In U.S. Pat. No. 4,730,526, entitled CONVEYOR VACUUM TABLE FOR FEEDING SHEET MATERIAL, issued to Pearl et al on Mar. 15, 1988, it is disclosed that a conveyor table have a plurality of windows or zones which define generally rectangular areas in which vacuum is introduced and shut off in accordance with where the cutter head is moved. The selective opening and closing of zones is accomplished by providing actuators which are connected with a numeric controller for the purpose of controllably energizing and reverse energizing the actuators such that the vacuum is applied only to a region surrounding the cutter head, for example, at least 2 feet in the plus and minus directions along the length of the table. While the apparatus disclosed in U.S. Pat. No. 4,730,526, utilizes computer controlled zoning, no provision is made, for example, for settling time or knife feedrate as a parameter to define contours.

Accordingly, it is an objective of the invention to provide a vacuum zoning system whereby a controller is responsible for zoning given vacuum regions on a cutting table in accordance with anticipated movements of the cutter head prior to the cutter head actually moving to a zone.

It is yet a further object of the invention to provide an apparatus of the aforementioned type wherein zoning occurs in a cutter bed so as to allow the layup of sheet material to settle prior to the cutting through by the cutter blade of the layup.

It is still a further object of the invention to provide a method whereby data used in the creation of contours in a cutting operation is employed to also control the on and off sequencing of zoning and to create a sliding window of zones which follow the path of the cutter head.

Still a further object of the invention is to provide a zoning control system whereby zone overlap occurs where a line of cut extends in the immediate vicinity of the beginning point of the next adjacent zone.

Another object of the invention is to provide a vacuum control system of the aforementioned type wherein the power output of a vacuum generator is reduced during periods of non-use in a cutting procedure to enhance energy savings.

SUMMARY OF THE INVENTION

The invention resides in a method and related system for controlling vacuum to specific areas of a cutter bed of the type having a permeable support surface comprised of bristle bed. This includes providing a permeable support surface having a given area as defined by a length and a width dimension and dividing the given area into zones having a first dimension extending parallel to the width dimension and a second dimension extending parallel to the length dimension of the bed. A vacuum source is provided and is controllably connected to each of the zones through separate conduit means. Valve means are also provided and are associated with each of the conduit means for controlling the passage of vacuum between the vacuum source to each of the plurality of zones respectively. Data corresponding to motion controls of the cutter head over the cutting surface is used to drive opening and closing of respective ones of the valves such that energized zones occur as a result of either the cutter head being directly over the involved zone or approaching an adjacent zone which is disposed immediately adjacent the zone occupied by the cutter.

DETAILED DESCRIPTION OF THE PREFERRED EMBODIMENT

Figure 1:
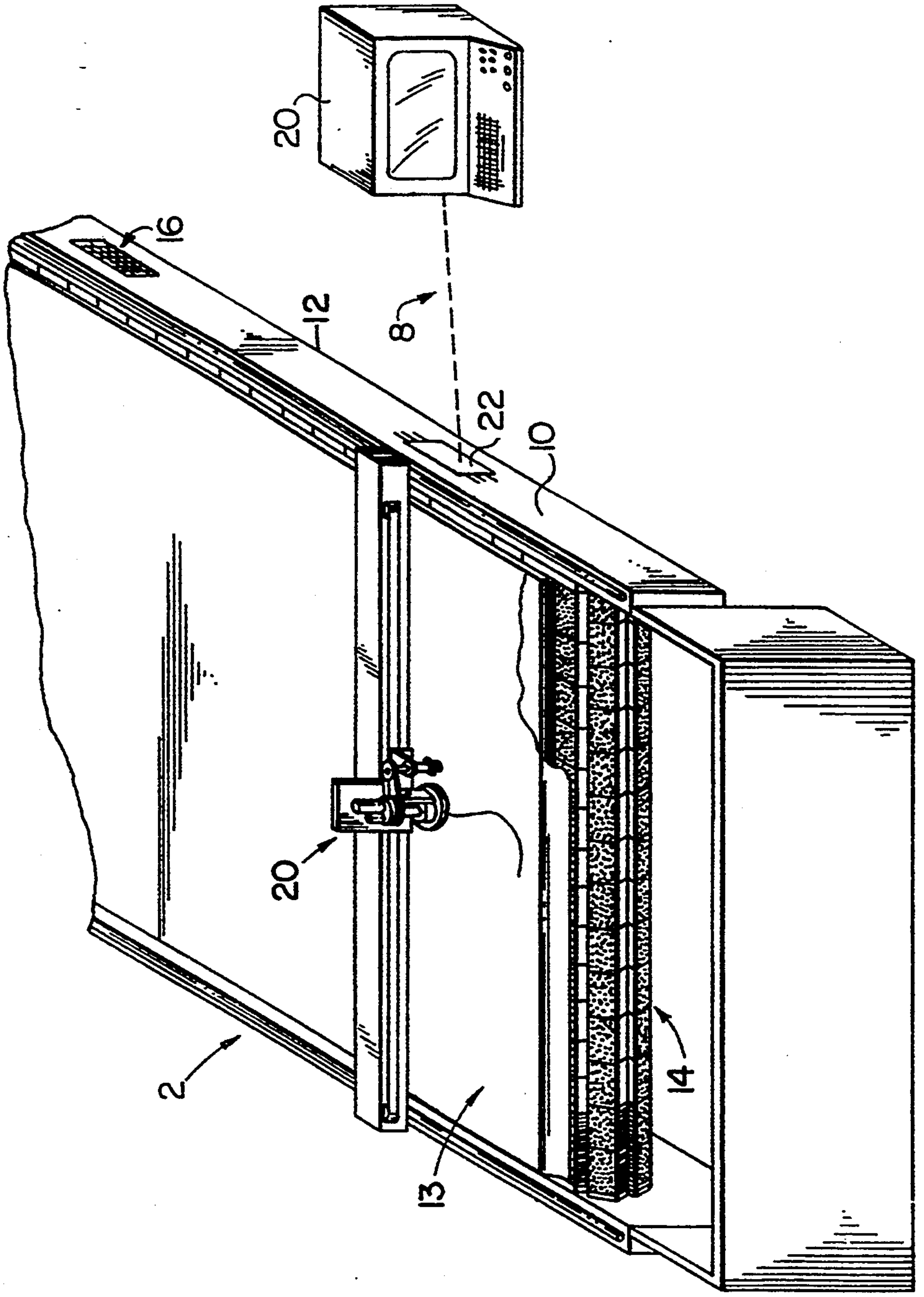
FIG. 1 is a perspective view of the cutter embodying the invention.

FIG. 1 illustrates the apparatus employed in the present invention. The apparatus generally designated as 2 includes a table 10, a frame 12, a conveyor 14 having an air permeable bristle bed for supporting and transferring sheet material 13, a vacuum holddown system 16 for holding sheet material onto the conveyor 14, a cutter assembly 20 for cutting the sheet material 13 and a controller 8 including a computer for driving appropriate drive motors and actuators connected to the conveyor and to the cutter assembly for coordinating movements therebetween. The controller is comprised of a front end processor 20 and a motion control board 22 which contains a motion control computer 42 which is responsible for building motion contours and for the immediate movements taken by the cutter head and is likewise responsible for zoning of vacuum the support table and the advancement of sheet material by the conveyor 14.

Figure 2:
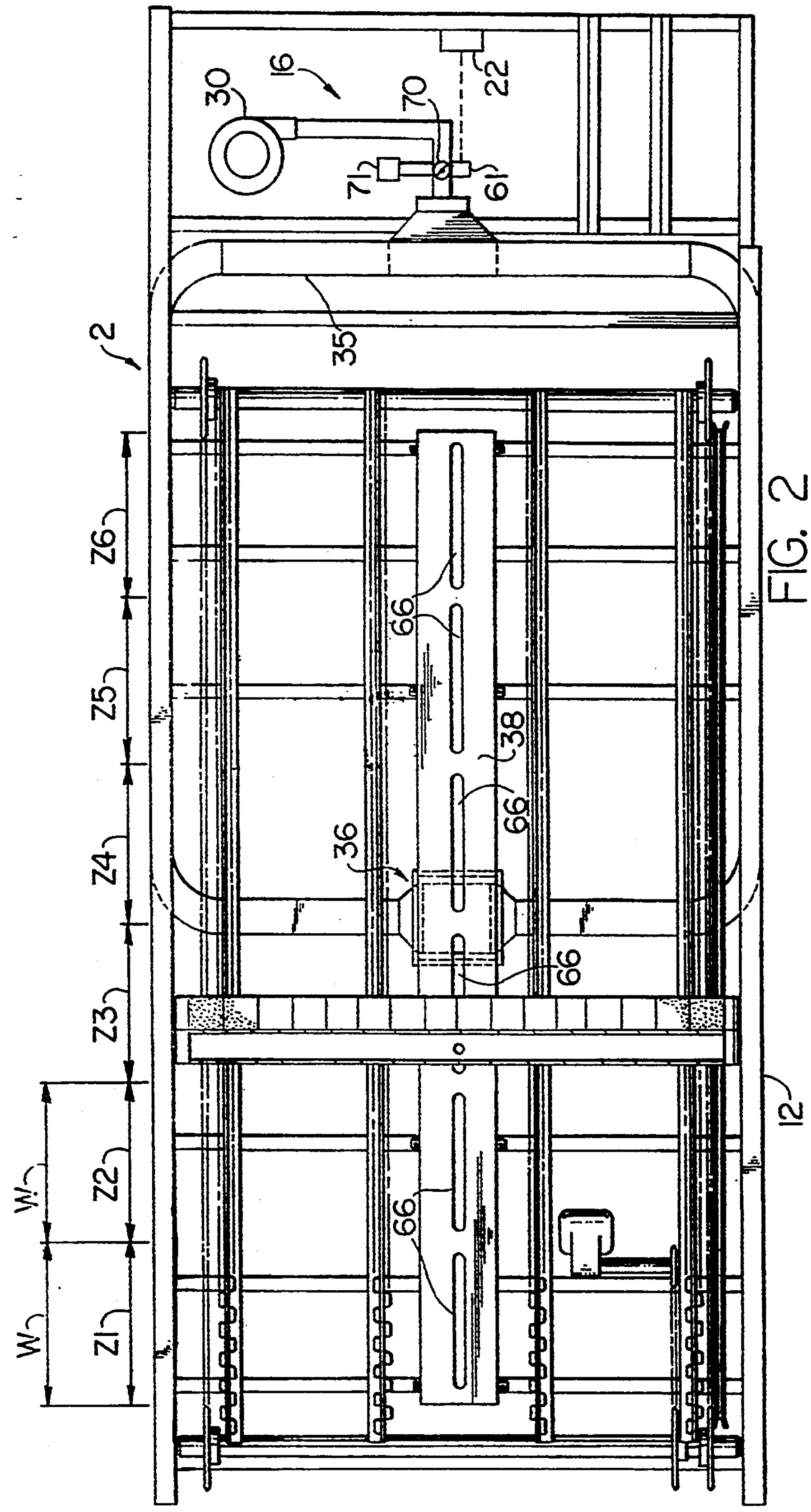
FIG. 2 is a partially fragmentary view of a cutter table with the bristle support surfaces removed to reveal the window manifolds.
Figure 3:
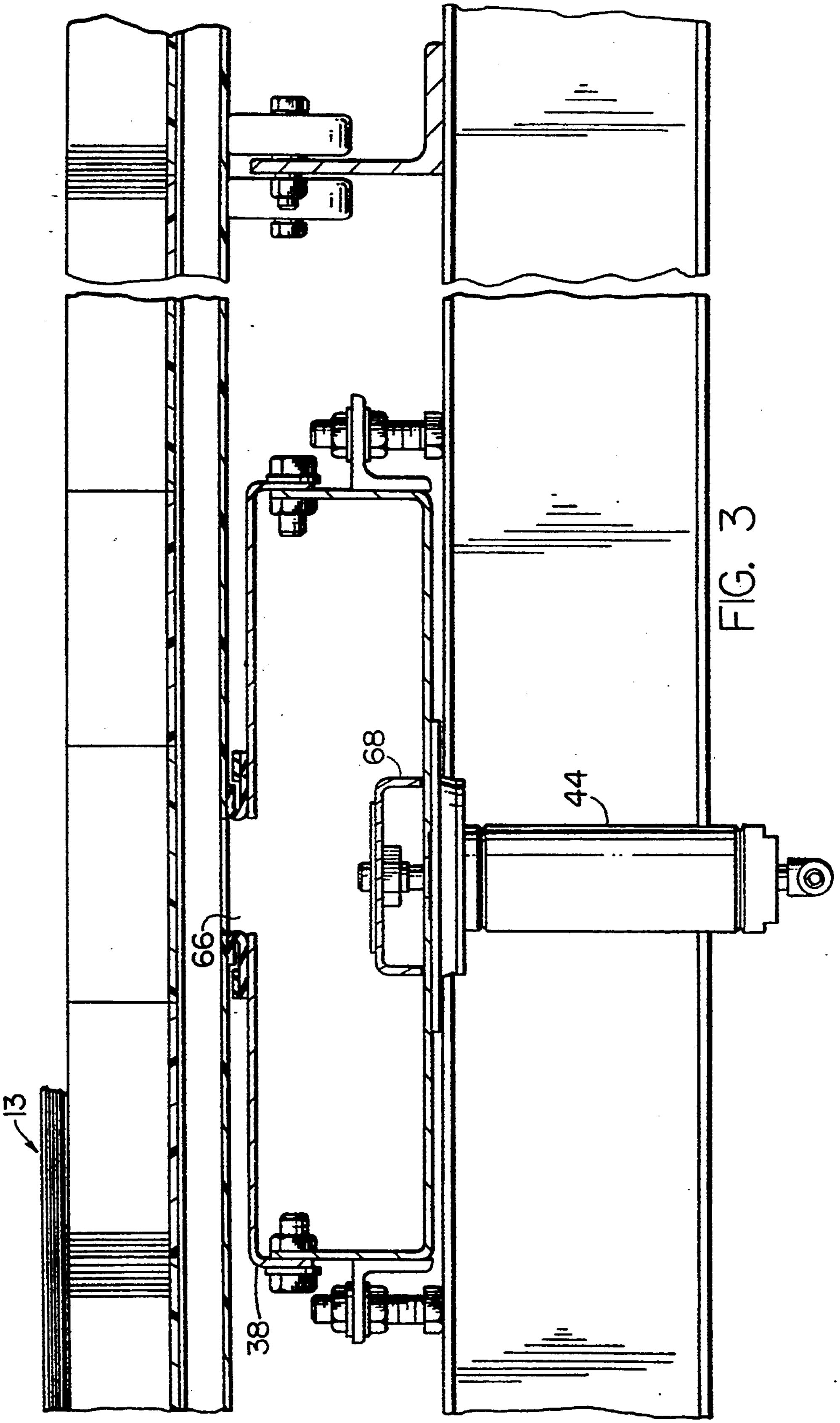
FIG. 3 is a vertical section through the cutter of FIG. 1 showing the plunger valve assembly.

As shown in FIG. 2, the vacuum system 16 comprises of vacuum pump 30 whose intake communicates with the bristle bed through a vacuum manifold 36 and a vacuum conduit 55 which is part of the frame 12 and connects the vacuum manifold to the pump. The vacuum manifold 36 comprises of a duct 38, with window openings 66,66 facing the bristle bed and exposing the interior of the manifold. As best illustrated in FIG. 3, the introduction of vacuum pressure between the windows and the duct is controlled by a plurality of plunger shutters 68,68 which are used to individually close and seal each window associated with the respective zone and are connected to the table for this purpose to pneumatic or electrical actuators 44,44 to move the shutters between closed and open positions. The windows are generally elongate openings extending in their lengthwise direction parallel to the indicated X-coordinate direction of the table. The windows in essence define the width W of a plurality of zones $Z_1$, $Z_2$, $Z_3$, $Z_4$, $Z_5$ having shorts sides extending parallel to the length dimension of the table and along sides extending parallel to the width dimension of the table. Thus, for a table on the order of 6 feet long, five separate vacuum zones are provided each being approximately 14 inches in length, this dimension only being mentioned for purposes of illustration and should not be construed as limiting since different configurations for zones can be adapted by applicable software, for example, to accommodate a greater number of zones each having a narrower dimension. For a more complete description of the vacuum system in the illustrated example, reference may be had to the aforementioned Pearl et al U.S. Pat. No. 4,730,526, which patent is hereby incorporated by reference.

Figure 4:
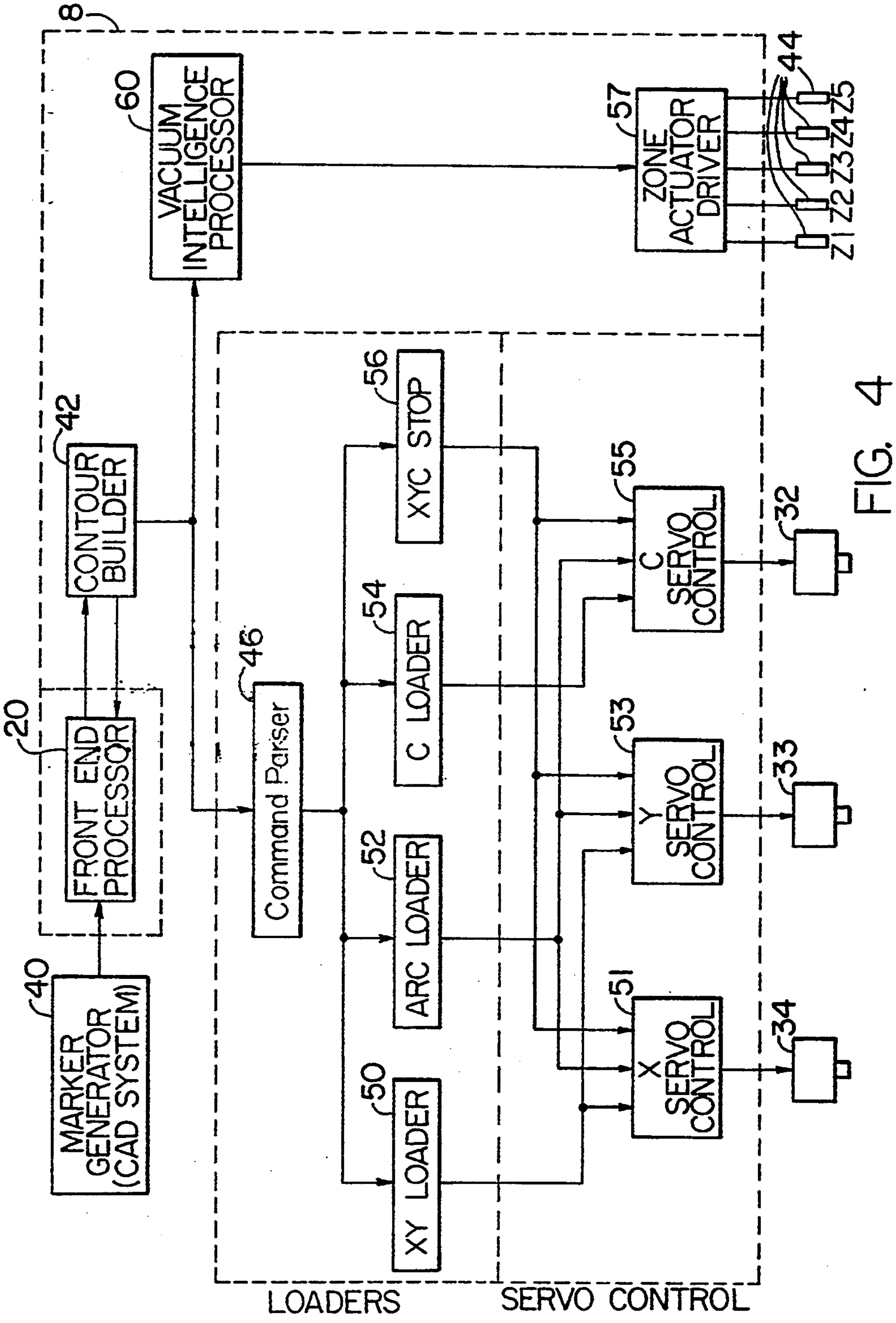
FIG. 4 is a block diagram of the software system of the controller.

Referring now to FIG. 4 and generally to the controller 8, it should be seen that the controller accepts information from a marker generator 40 (CAD system) which originates information on marker shapes and the arrangements of the shapes relative to one another. The controller is comprised of a motion control computer with a contour builder processor 42 for communicating with loaders which drive X, Y and C axes motors along with the plunger shutter actuators and the front end processor 20 which communicates information between the marker generator and the contour builder. Each of the X, Y and C axis motors 34, 36 and 32 and the actuators 44,44 is respectively linked to an associated servo unit which directly controls either the positioning of the blade or the opening and closing conditions of the actuator. Also, provided as part of the contour builder is an XY loader which generates straight line position commands to respective servo units 51,53, an arc loader for 52 for generating curve line position commands to each of the servo control units, a C-loader for generating data position commands for C-axis movement to the servo unit 55, an XYC stop loader for generating stop position commands to each servo unit responsible for X, Y and C axes movements and a vacuum intelligence processor 60 responsible for controlling the on, off conditions of the actuators 44,44 through an actuator driver 57. One or more loaders responsible for generating a given movement receive instructions from a command parser 46 which tells designated ones of the separate independent loaders to issue motion control commands and/or on, off commands to the respective ones of the driven elements. Each of the XY- and C-loaders is responsible for generating position, velocity and acceleration commands at uniform intervals, while the XYC stop loader generates ramping down motion controls for all stopping movements involved in the velocity profile. The vacuum zone loader which also takes its instructions from the parser is driven by the same position and acceleration commands used to drive the other loaders.

The contour builder builds contours based on variables, such as, maximum velocity or throughput speeds, $V_{max}$, and maximum moving turn angle, Amax, which are entered into the computer at the beginning of a job. Next, a given contour is identified by the segments which define it. Each contour is defined by beginning and end points which are called breaks and correspond to stop conditions of the cutter head. Subsequent examination of the downloaded cut data is also made to determine if additional breaks are needed. For example, all non-motion commands occurring along a cut path are reviewed by interrogating instructions such as, tool select, tool up and down, conveyor advance, knife sharpening stop, any other command which would cause the cutter head to stop along a given path in a contour. If such a command is found to exist, then a break is created at that point along two adjacent segments. Additionally, the cut data is next checked against the inputted pre-determined maximum angle Amax to determine whether as between consecutive line segments the angle therebetween is greater than the predetermined maximum angle $A_{max}$. If the angle existing between any two consecutive segments is greater than $A_{max}$ then a break is generated at that point and a subsequent command such as rotate blade and/or lift and rotate blade and subsequently plunge command is generated at that point in order to negotiate the corner from a stopped condition. If the angle $A_{max}$ is within acceptable parameters, then a smooth corner or fillet is created in accordance with the provisions provided for in the aforementioned U.S. patent application Ser. No. 08/040,160, entitled CONTOUR BUILDER which application being hereby incorporated by reference in the present application.

Figure 5:
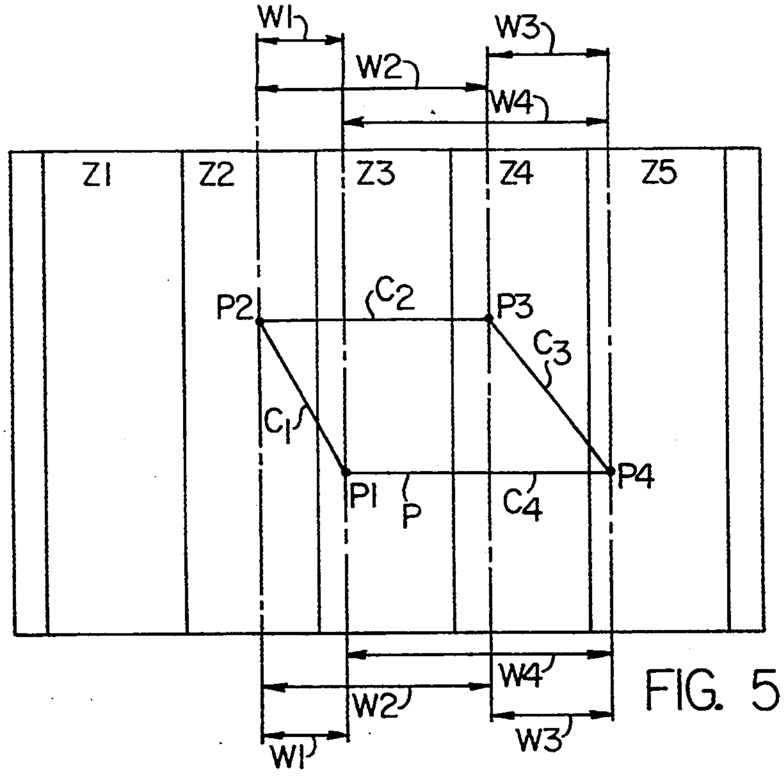
FIG. 5 shows the path taken along a given cutting path including the points used in the look ahead feature.

Following the creation of breaks and/or fitted arcs within a contour, a velocity profile is created for each contour using the segments which make up the contour as distinct points in the velocity profile. This process is controlled by a sequence of steps which together create the ramping and downramping and, if applicable, an intermediate plateau of the profile which are generated in accordance with system parameters. As illustrated in FIG. 5, the path P of the piece to be cut is defined by four contours respectively $C_1$, $C_2$, $C_3$ and $C_4$ each of which respectively including a single straight line segment. For each line segment of the contour, and in the case of that shown in FIG. 5, each line segment which makes ups a contour, peak and ending velocities are determined as set forth in the aforementioned U.S. patent application Ser. No. 08/040,160. Any change in velocity relative to time, i.e. acceleration, signifies either a change of direction or a the approach of an end point or break. This is because for different knife movements around very tight arcs or fillets, velocities around these points will need to be far below the maximum straight line feedrate given the mechanical parameters that need to be taken into consideration.

Figure 6:
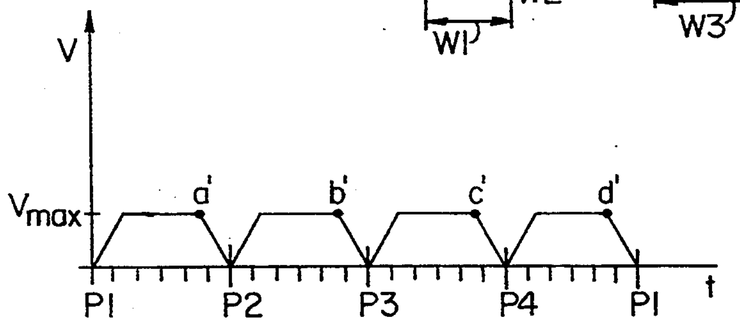
FIG. 6 illustrates a velocity profile for the contour of FIG. 5.

In accordance with the invention, the illustrated velocity profile shown in FIG. 6 corresponds to the path P followed by the cutterhead illustrated in FIG. 5, and which profile is used by the processor 42 to determine if a new zone or zones need to be open. That is, during cutting, the processor uses its knowledge of both the current beam position and the expected future beam position to create a variable size sliding zone window. While cutting, a sliding window made up of from one to three adjacent zones may be activated. For purposes of illustration, the route taken by the cutter blade shown in FIG. 5 between points P1 and P2 will cause a window W1 to be created such that zones Z3 and Z2 are opened to vacuum pressure. As between points P2 and P3, a new window W2 will be created which includes zones Z2, Z3 and Z4. In moving between points P3 and P4, window W3 is created which includes only zones Z4 and Z5 being energized, and the previously energized zones Z2 and Z3 being deenergized. Such deenergization of the departed from zone, is done in accordance with a look ahead function to limit unnecessary thrashing as will become apparent later. A final window W4 is created as between points P4 and P1 which includes zones Z5, Z4 and Z3. Thus only those zone in which the cutter head is presently occupying or will occupy or comes close to occupying during the course of cutting a contour line will be activated.

As is apparent, each window is comprised of the zone located directly below the cutter head as well as up to two additional look-ahead zones which are zones that are expected to be required in the near future. The processor 42 utilizes information from its motion control algorithms to look ahead and determine when the knife is going to exit the current zone and enter a new one. These look-ahead zones are added to the sliding window in time for the knife's arrival in the new zone while the previously occupied zone is deenergized in accordance with a set parameter. The new zone(s) are not activated simultaneously with the determination that the cutter head will be moving into the new domain. The advance timing of the activation of look-ahead zones depends on the valve actuation and reaction time of the zoning system, for example, zone activation will be between 0.1 and 0.5 seconds which accounts for combined valve actuation reaction time plus reaction the time to pull air through the valve.

Referring now to the method by which look ahead zoning is accomplished by the system, it should be seen that the processor 42 uses the velocity profile for a given contour line or segment thereof to establish points therealong where zone window adjustment can be made. As best illustrated in FIG. 6, the points a′,b′,c′, and d′ of the velocity profile for the pattern piece shown in FIG. 5, all correspond to rampdown velocities or system decelerations which are identifiable to the processor and signify the existence of a direction change or a stop condition of the cutter head. The processor uses these points as landmarks in its look ahead procedure to establish the location of the next end of travel position of the cutter head, and hence the creation of a new window. For example, with the beginning of the cutting process from point P1 lying within zone Z3, the processor look ahead function determines point P2 as being located within a different zone, namely zone Z2, and therefore creates window W1 which includes zones Z3 and Z2, or any intervening zones which may exist therebetween. The adjacently disposed new zone Z2 is not immediately activated, and will not be until the cutter head moves to a position nearby by the new zone as determined by the advance timing parameter. The clocked motion control instructions are used to determine the relative position of the cutter head with respect to the beginning of the next zone, and using this data, the system can initiate the activate command to the zone Z2 actuator in time for the cutter's arrival at that zone. It should be noted that for purposes of convenience of illustration, the end point P2 is the end point of the contour line C1, but could as well had been only an endpoint of an intermediate segment of the contour line. The system senses only those points along a given contour line or segment where deceleration occurs.

Figure 7:
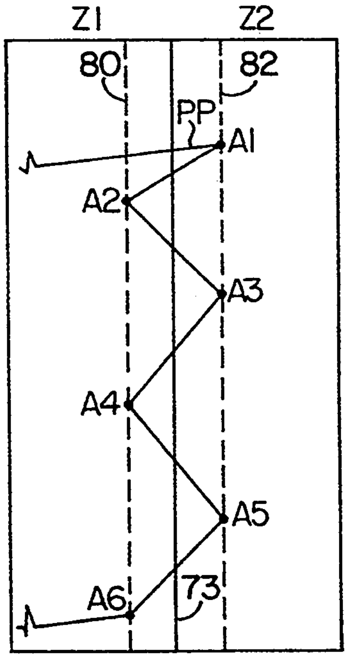
FIG. 7 illustrates the zone overlap feature of the invention.

It is a feature of the invention that as the cutter head leaves one zone and enters a next, the processor will deactivate the departed zone only if the cutter is not expected to return within a given time interval. Thus, during cutting, the system activates and deactivates vacuum zones in real time such that only a minimum number of zones are required to be opened at any particular time. The look ahead feature of the processor is again used to determine if return to the departed zone is expected within a given time interval. This interval is again set to accommodate valve reaction time and vacuum response behavior. As best illustrated in FIG. 7, in the case where the path PP to be taken by the cutter head oscillates across a zone line 73, the travel time between the odd and even labelled points is such that "thrashing" between zones Z1 and Z2 would otherwise occur except for the implementation of this parameter.

Also, the system provides for zone overlap feature which is activated when the cutter being moved within prescribed margins 80 and 82 along the border 73 coinciding with the end edge of one zone and the beginning of another. The amount of overlap is software configuable which would not otherwise be possible in systems where mechanical switches are used to trigger on/off conditions in a given zone. This insures that the requisite vacuum draw surrounding the cutting tool is provided despite the proximity of the instant zone's end edge. Also, during all biting operations, that is, the advancing of segments of sheet material in segments by segment manner, all zones except the first zone Z1 adjacent the discharge end are activated for material takeoff purposes.

It is another feature of the invention to provide a vacuum level control system which provides a relatively stable level setting regardless of the number of vacuum zones that are used. The system permits different vacuum levels to be supported during a cutting session to enhance for example, energy efficiency. That is, the system is capable of maintaining one vacuum level during cutting and another different level during advancing of the layup and a third level during idle periods corresponding to when the layup is supported on the table but for some reason a cutting operation has been temporarily suspended.

To these ends, the vacuum system is provided with a vacuum pressure sensor 60 connected to an analog input into the control board 22. The control board for this purpose includes an analog to digital convertor which is thereafter interrogated by the subprocessor 42 in the control board to establish the real time vacuum pressure in the manifold. The system 16 further includes a two position vacuum flow control valve 70 used in controlling the vacuum level in the entire table located within the manifold and communicates between an exhaust port 71 and the vacuum manifold such that when the valve is opened vacuum will flow freely through to the manifold and when it is closed the vacuum is choked and the vacuum is directed to the exhaust port 71.

A vacuum level control system is provided and employs a control feedback loop which continuously monitors the vacuum level through the sensor 60 and opens and closes the exhaust valve 71 to maintain a desired manifold pressure in order to compensate for the zoning process. Full vacuum provided by the source 30 is sufficient to draw in all zones of the table.

The system is capable of automatically entering an energy saving mode in which the vacuum generator is on but the system cutting operations are not being conducted. In this condition, the vacuum control valve is moved to its closed position so as to choke vacuum to atmosphere thereby reducing power consumption and noise. The system only enters energy saving mode when a given interval passes without cutting or some other action being taken. Examples of when the idle mode will be used occurs when the system is first turned on, or once an interval passes after the system completes the processing of a marker or a manual bite, or after an interval passes when an error occurs. The system will never enter the energy saving mode when stopped in the middle of a marker however. This is to ensure that registration is maintained between the layup as originally found and the orientation assumed after any breaking in the cutting operation. It is noted that whenever the vacuum system moves from the energy saving mode to a cutting mode, a short time delay is allowed for to allow the vacuum pressure to ramp up and cause settling of the fabric material.

By the foregoing a system for controllably zoning vacuum in a cutter bed has been disclosed by way of example. Modifications and substitutions may be had without departing from the spirit if the invention. For example, while a five zone array is disclosed in the illustrated embodiment, any variation on this number may be utilized to effect, for example, a higher resolution of control areas by providing a greater number of zones.

Accordingly, the application has been described by way of illustration rather than limitation.

We claim:

1. A method of controlling vacuum to specific areas of a cutter bed of the type having a permeable support surface comprised of bristle bed, said method comprising the steps of:

providing a permeable support surface having a given area as defined by a length and a width dimension;

dividing the given area into zones having a first dimension extending parallel to the width dimension and a second dimension extending parallel to the length dimension of the bed;

providing a vacuum source and controllably connecting the vacuum source to each of said zones through separate conduit means;

providing valve means associated with each of said conduit means for controlling the passage of vacuum between said vacuum source to each of the plurality of zones respectively;

providing in a controller data corresponding to motion controls of a cutter head having a cutter over the cutting surface and using said data to drive opening and closing of respective ones of said valves by providing a look ahead feature as part of the controller which determines from said motion control data prior to the arrival of the cutter at a given zone and prior to its departure from a presently occupied zone which of said respective ones of said valves is to be opened and closed such that energized zones occur as a result of either the cutter being directly over the involved zone or cutter head approach to an adjacent zone which is disposed immediately adjacent the zone presently occupied by the cutter.

2. A method as defined in claim 1 further characterized by the step of using said motion control data to determine the beginning and the end point of segments of an involved contour and then determining whether the location of the beginning end point relative to the zone in which it exists is the same or different zone from the zone in which the end point is located in.

3. A method as defined in claim 2 further characterized by activating the zone in which the end point of the contour is located in is different from the beginning point zone just prior to the cutter entering that zone.

4. A method as defined in claim 3 further characterized in that determining segments between the beginning and end point of a given contour involves assigning to each segment a velocity quantity associated with the beginning of one segment and the ending of another; and determining whether any difference in velocity exists at the beginning and ending points between successive segments.

5. A method as defined in claim 4 further characterized in that the step of determining if acceleration changes occur between successive segments in a contour further includes the step of within a given contour determining the position at the next change of acceleration based on the present position of said cutter.

6. A method as defined in claim 5 further characterized by looking ahead along a given contour at the uniform intervals to determine where along the contour the next change of acceleration occurs and noting the next change of acceleration point as the location of a new window.

7. A method as defined in claim 6 further characterized by providing as part of said look ahead feature a sliding window which follows the cutter tool and opens and closes zones in time for the cutter tool arrival at the zone to effect settling of material on the support surface.

8. A method as defined in claim 7 further characterized by providing a relief valve disposed intermediate a vacuum generator and the zone conduits for venting vacuum to atmosphere and controllably fluttering a control valve between on and off positions in response to the required vacuum necessitated by the selected opening and closing of zones.

9. A method as defined in claim 8 further characterized by providing a second vacuum power to the vacuum generator corresponding to a lower power condition and allowing the vacuum generator to operate at the lower setting during an idle condition corresponding to when cutting does not occur on a layup that is situated on the bed and/or when advancement of the layup occurs off the table.

10. A method as defined in claim 9 further characterized in that the zone immediately adjacent the discharge end of the table is deactivated and the remaining zones on the table remain activated during offloading of a layup from the table and onto a discharge surface.

11. A method as defined in claim 10 further characterized by providing overlapping zones whereby although the cutter is not moved into the adjacent zone it is nevertheless close enough to cause energization of the adjacent zone.

12. A method as defined in claim 11 further characterized by providing a reference interval and looking ahead to the next acceleration change point to see if there is a return back to the presently occupied zone within the given interval.

13. A system for controlling vacuum so as to controllably energize and deenergized specified areas of a cutter bed of the type having a permeable support surface comprised of bristle bed, said system comprising:

a permeable support surface having a given area as defined by a length and a width dimension;

means dividing the given area into zones having a first dimension extending parallel to the width dimension and a second dimension extending parallel to the length dimension of the bed;

a vacuum source controllably connected to each of said zones through separate conduit means;

valve means associated with each of said conduit means for controlling the passage of vacuum between said vacuum source to each of the plurality of zones respectively;

control means for providing data corresponding to motion controls of a cutter head having a cutter over the cutting surface and using said data to drive opening and closing of respective ones of said valves by providing a look ahead feature as part of the controller which determines from said motion control data prior to the arrival of the cutter cutting tool at a given zone and prior to its departure from a presently occupied zone which of said respective ones of said valves is to be opened and closed such that energized zones occur as a result of either the cutter head being directly over the involved zone or approaching an adjacent zone which is disposed immediately adjacent the zone occupied by the cutter.

14. A method of controlling vacuum to specific areas of a cutter bed of the type having a permeable support surface comprised of bristle bed, said method comprising the steps of:

providing a permeable support surface having a given area as defined by a length and a width dimension;

dividing the given area into zones having a first dimension extending parallel to the width dimension and a second dimension extending parallel to the length dimension of the bed;

providing a vacuum source and controllably connecting the vacuum source to each of said zones through separate conduit means;

providing valve means associated with each of said conduit means for controlling the passage of vacuum between said vacuum source to each of the plurality of zones respectively;

providing in a controller data corresponding to motion controls of a cutter head having a cutter over the cutting surface and using said data to drive opening and closing of respective ones of said valves by providing a look ahead feature as part of the controller which determines for said motion control data prior to the arrival of a cutter tool which of said respective ones of said valves is to be opened and closed such that energized zones occur as a result of either the cutter being directly over the involved zone or cutter head approach to an adjacent zone which is disposed immediately adjacent the zone presently occupied by the cutter; and the step of using said motion control data to determine the beginning and the end point of segments of an involved contour and then determining whether the location of the beginning end point relative to the zone in which it exists is the same or different zone from the zone in which the end point is located in.

* * * * *

UNITED STATES PATENT AND TRADEMARK OFFICE
CERTIFICATE OF CORRECTION

PATENT NO. : 5,414,617

DATED : May 9, 1995

INVENTOR(S) : Pomerleau et al.

It is certified that error appears in the above-identified patent and that said Letters Patent is hereby corrected as shown below:

Claim 7

Column 9, Lines 3 and 4, "tool" should be deleted.

Claim 13

Column 10, Line 7, "cutting tool" should be deleted.

Claim 14

Column 10, Line 39, "tool" should be deleted.

Signed and Sealed this

Twelfth Day of September, 1995

Attest:

BRUCE LEHMAN

*Attesting Officer* *Commissioner of Patents and Trademarks*